Sept. 22, 1959　　　M. S. SPARKS, JR　　　2,905,823

ANALYZER AND VOLTAGE MEASURING CIRCUIT

Filed July 18, 1956

INVENTOR.
M. S. SPARKS, JR.

BY *Hudson & Young*

ATTORNEYS

United States Patent Office 2,905,823
Patented Sept. 22, 1959

2,905,823

ANALYZER AND VOLTAGE MEASURING CIRCUIT

Marshall S. Sparks, Jr., Los Angeles, Calif., assignor to Phillips Petroleum Company, a corporation of Delaware Application July 18, 1956, Serial No. 598,575

14 Claims. (Cl. 250—43.5)

This invention relates to an improved optical analyzer. In another aspect it relates to apparatus for measuring electrical signals.

A number of optical analyzers have recently been developed to analyze sample streams in terms of the radiation absorption properties thereof. A beam of radiation is directed through a sample of the substance to be analyzed and the transmitted radiation is measured. In one particular analyzer of this type, a mechanical chopper is rotated in the radiation beam at a predetermined frequency. The chopper comprises alternate sections of material which are transparent to the radiation and which have radiation absorption properties similar to those of a particular substance to be detected. The resulting radiation beam thus fluctuates in intensity. The difference in intensity between adjacent half cycles of the radiation beam is representative of the concentration of the particular substance to be detected. This intensity difference is measured by providing a corresponding electrical signal.

Heretofore, small amplitude alternating electrical signals have commonly been measured by rectifying the signal and comparing it with a reference direct voltage. Any potential difference is converted back into an alternating signal and amplified. The amplified signal energizes a servo motor to adjust the reference voltage until it is equal to the signal being measured. In accordance with the present invention, an improved measuring circuit is provided. The alternating signal to be measured is superimposed on a reference direct voltage. The resulting signal is compared with a reference alternating signal of the same frequency as the signal to be measured. Any difference between these two signals energizes a servo motor to adjust the magnitude of the reference direct voltage until the two signals are equal. This measuring circuit results in the elimination of the rather costly mechanical chopper which has previously been required to convert the direct voltage into a corresponding alternating signal.

In accordance with another aspect of this invention, a direct voltage is measured by superimposing the voltage on a reference alternating signal. The resulting signal is then compared with a second reference alternating signal. Any difference between the two signals energizes a servo motor to adjust the magnitude of the first mentioned reference alternating signal.

Accordingly, it is an object of this invention to provide improved apparatus to analyze fluid streams in terms of the radiation absorption properties thereof.

Another object is to provide apparatus for measuring radiation beams which fluctuate in intensity at a predetermined frequency.

A further object is to provide apparatus for measuring direct and alternating current signals.

Other objects, advantages and features of this invention should become apparent from the following detailed description which is taken in conjunction with the accompanying drawing in which.

Figure 1:
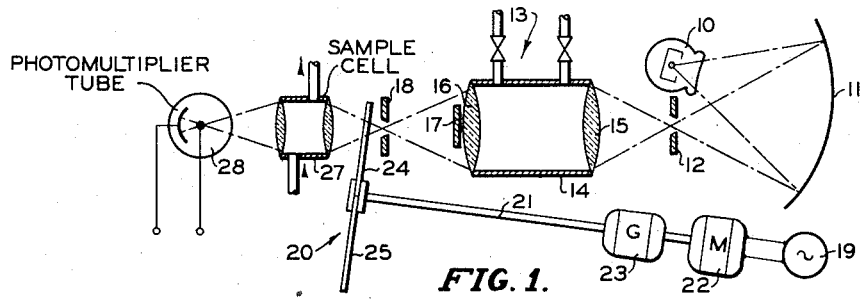
Figure 1 is a schematic view of the optical system of an analyzer in which the present invention is particularly applicable.

Referring now to the drawing in detail and to Figure 1 in particular, there is shown an optical analyzer which is particularly adapted to detect butadiene, for example, in a fluid stream. Radiation in the ultraviolet spectrum is provided by a source 10, which can be a hydrogen discharge lamp. Radiation emitted from source 10 is directed by a mirror 11 through an aperture 12 to a focal isolation monochromator 13. Monochromator 13 comprises a cell 14 having lenses 15 and 16 at the two ends. A circular mask 17 is positioned adjacent lens 16, and an exit aperture 18 is spaced therefrom. Mask 17 blocks the axial rays of radiation which are transmitted through lenses 15 and 16. Because of the chromatic aberration of the lenses, different wave lengths of radiation have different focal points with respect to aperture 18. Thus, mask 17 and aperture 18 block wave lengths longer and shorter than a predetermined value so that only a selected band of wave lengths is transmitted through the assembly. In the analysis of butadiene, it is desired to adjust the assembly so that wave lengths in the region of approximately 2000 to 2800 Angstroms are transmitted. The interior of cell 14 can be filled with a filter material, such as chlorine gas, which has an ultraviolet cutoff at approximately 2750 Angstroms. This makes the adjustment of the monochromator less critical.

A chopper disk 20 is positioned for rotation in the beam of radiation transmitted through aperture 18. Disc 20 is connected by a shaft 21 to a synchronous motor 22 through speed reduction gearing, not shown. An alternating current generator 23 is also connected to drive shaft 21. The function of generator 23 is discussed hereinafter in detail. Disc 20 comprises two sectors 24 and 25 which are constructed of quartz and Vycor, respectively. Vycor is a glass manufactured by Corning Glass Works, Corning, New York, and contains approximately 96 percent silicon dioxide. The ultraviolet transmission properties of Vycor are similar to those of butadiene. Quartz is transparent to radiation of wave lengths in the region of interest, whereas butadiene and Vycor are partially opaque. Rotation of disc 20 thus results in a transmitted beam of radiation having an amplitude which varies in substantially the manner of a rectangular wave form.

This fluctuating radiation beam is directed through a sample cell 27 which is adapted to receive the material to be analyzed. The beam emerging from sample cell 27 impinges on a photomultiplier tube 28. The half cycles of the transmitted beam which pass through the Vycor sector of disc 20 do not change in intensity when transmitted through cell 27. However, the half cycles of radiation which pass through the quartz sector are diminished in intensity in accordance with the amount of butadiene present in the sample cell. The difference in intensity between the two half cycles thus provides an indication of the amount of butadiene present in the sample cell. This difference is measured by the detecting circuit connected to photomultiplier tube 28.

Figure 2:
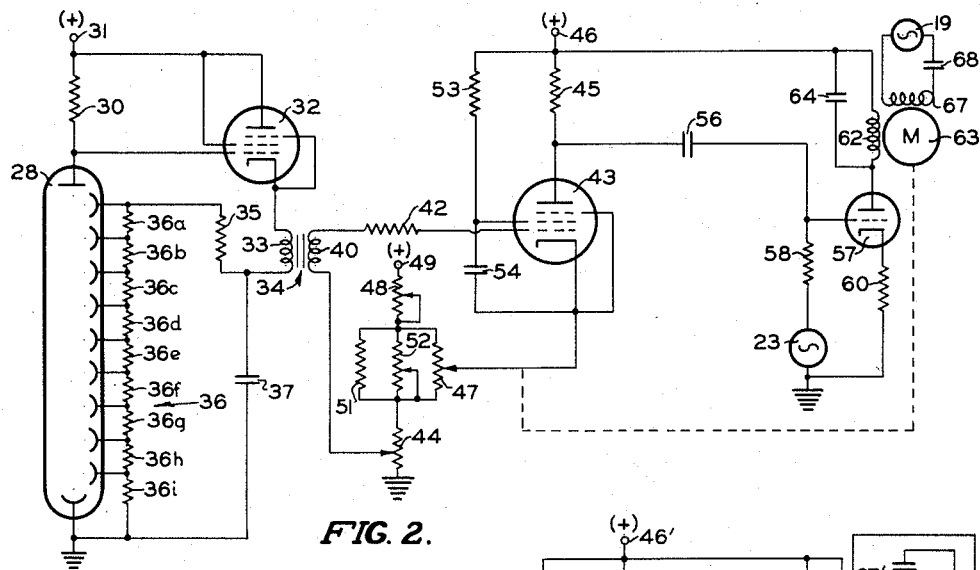
Figure 2 is a schematic circuit drawing of a first embodiment of the measuring circuit of this invention.

The detecting circuit of the present invention is illustrated in Figure 2. The cathode of photomultiplier tube 28 is connected to ground. The anode of tube 28 is connected through a resistor 30 to a terminal 31 which is maintained at a steady positive potential. The anode of tube 28 is also connected to the control grid of a pentode 32. The anode and screen grid of pentode 32 are connected to terminal 31. The cathode and suppressor grid of pentode 32 are connected to the first terminal of the primary winding 33 of a transformer 34. The second terminal of transformer winding 33 is connected to the first terminal of a resistor 35. The second terminal of resistor 35 is connected to ground through a voltage dividing network 36 which comprises series connected resistors 36a 36b ... 36i. A capacitor 37 is connected between the second terminal of transformer winding 33 and ground. The dynodes of tube 28 are connected to respective junctions between the resistors of network 36, as illustrated.

The first terminal of the secondary winding 40 of transformer 34 is connected through a resistor 42 to the control grid of a pentode 43. The second terminal of transformer winding 40 is connected to the contactor of a potentiometer 44. One end terminal of potentiometer 44 is connected to ground. The anode of pentode 43 is connected through a resistor 45 to a positive potential terminal 46. The suppressor grid and cathode of pentode 43 are connected to one another and to the contactor of a potentiometer 47. One end terminal of potentiometer 47 is connected to the second end terminal of potentiometer 44. The second end terminal of potentiometer 47 is connected through a variable resistor 48 to a positive potential terminal 49. A resistor 51 and a variable resistor 52 are connected in parallel with potentiometer 47. Resistors 48, 51 and 52 thus permit adjustment of the reference potential at the contactor of potentiometer 47. The screen grid of pentode 43 is connected to terminal 46 through a resistor 53 and to the contactor of potentiometer 47 through a capacitor 54.

The anode of pentode 43 is connected through a capacitor 56 to the control grid of a triode 57. The control grid of triode 57 is connected through a resistor 58 to one terminal of an alternating voltage source 23, which is provided by generator 23 of Figure 1. The second terminal of voltage source 23 is connected to ground. The cathode of triode 57 is connected to ground through a resistor 60. The anode of triode 57 is connected to terminal 46 through the first winding 62 of a reversible two-phase induction motor 63. A capacitor 64 is connected in parallel with motor winding 62. Current source 19 is connected in series with a capacitor 68 and the second winding 67 of motor 63. The drive shaft of motor 63 is connected mechanically to the contactor of potentiometer 47.

A voltage regulating network is provided to maintain the D.C. component of the output signal from tube 28 constant despite minor fluctuations in the intensity of the radiation beam. If the conduction through tube 28 should increase due to an increase in intensity of the beam, the voltage at the anode of tube 28 decreases so as to decrease the voltage at the cathode of pentode 32. This decrease in voltage decreases the potential drop across network 36 so that each dynode in tube 28 is maintained at a lower voltage. These lower voltages reduce the gain of tube 28 so that the conduction therethrough diminishes to the original value. Conversely, if the radiation beam should decrease in intensity, there is less conduction through tube 28. This results in an increase in potential at the anode thereof and in the potential drop across network 36. The increase in potential drop increases the voltages on the dynodes of tube 28 to increase the gain of the tube.

However, this voltage regulation action is not responsive to the alternating component of the output signal of tube 28. Capacitor 37 is sufficiently large to pass alternating currents of the frequency corresponding to the frequency of the A.C. signal being measured so that these A.C. fluctuations are grounded. Thus, the regulating circuit compensates for fluctuations in the D.C. level of the measured signal, but is not influenced by the A.C. component of the signal. The A.C. component induces a signal in the secondary winding of transformer 34, and it is this signal that is measured to provide an indication of the concentration of butadiene in cell 27.

Any change in the amount of radiation received by tube 28 results in a corresponding signal being applied through cathode follower 32 and transformer 34 and appears between the control grid and cathode of pentode 43. A D.C. bias potential is superimposed on this signal from terminal 49 and the voltage dividing network associated therewith. Pentode 43 normally is biased so as to be slightly conductive. When the peak value of the signal applied to transformer 34 is slightly greater than the D.C. potential difference between the contactors of potentiometers 44 and 47, a small alternating signal is transmitted through pentode 43. Voltage source 23 is connected so as to be 180° out of phase with the signal at the anode of pentode 43. These two signals initially are equal in amplitude so that the input signal to triode 57 is zero and motor 63 remains stationary. If the alternating signal transmitted through transformer 34 should increase in amplitude, a signal is applied to the control grid of triode 57 which drives motor 63 in a first direction. This adjusts the contactor of potentiometer 47 upwardly until the two signals being compared by triode 57 are once again equal. If the signal transmitted through transformer 34 should decrease, conduction through pentode 43 is extinguished. This results in motor 63 being driven in a second direction to adjust the contactor of potentiometer 47 downwardly. The movement of the contactor of potentiometer 47 needed to restore the balance is indicative of the change in amplitude of the A.C. output signal from photomultiplier tube 28. The drive shaft of motor 63 can be connected to a dial or to a telemetering potentiometer, not shown, to provide an output electrical signal representative of the radiation beam impinging upon tube 28.

Figure 3:
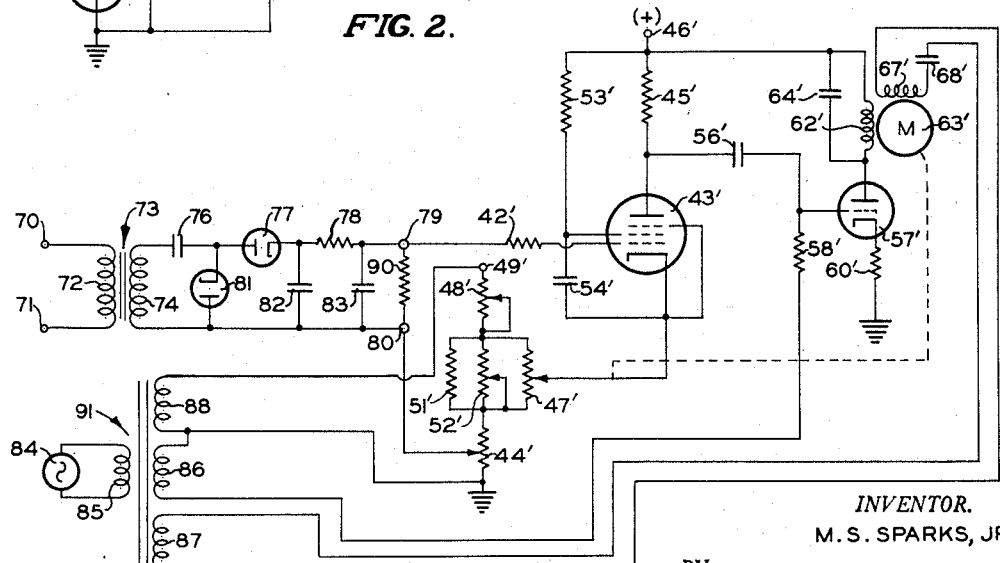
Figure 3 is a schematic circuit drawing of a second embodiment of the measuring circuit of this invention.

In Figure 3, there is shown a second embodiment of the voltage measuring circuit of this invention. The circuit of Figure 3 is similar to the circuit of Figure 2 in many respects and corresponding elements are designated by like primed reference numerals. An alternating signal to be measured is applied to input terminals 70 and 71 which are connected to the end terminals of the primary winding 72 of a transformer 73. The first terminal of the secondary winding 74 of transformer 73 is connected through a capacitor 76, a rectifier 77, and a resistor 78 to a terminal 79. The second terminal of transformer winding 74 is connected to terminal 80. A rectifier 81 is connected between terminal 80 and the junction between capacitor 76 and rectifier 77. Capacitors 82 and 83 are connected between terminal 80 and the respective end terminals of resistor 78. A resistor 90 is connected between terminals 79 and 80. The circuit thus far described comprises a voltage doubling rectifier network and filter so that a D.C. voltage appears between terminal 79 and 80. This voltage corresponds in amplitude to the alternating signal applied to the input terminals of the circuit. This direct voltage is measured by the indicating circuit.

In the circuit of Figure 2, an alternating potential is applied across the reference voltage dividing network. The secondary winding 88 of a transformer 91 is connected between terminal 49' and ground. An alternating current source 84 is connected across the primary winding 85 of transformer 91. The second reference potential which is applied to the control grid of triode 57' is provided by a second secondary winding 86 of transformer 91. Motor winding 67' is energized by a third secondary winding 87 of transformer 91. The operation of the circuit of Figure 3 is similar to that of the circuit of Figure 2. The direct voltage to be measured is superimposed on an alternating reference signal and applied to the input of pentode 43'. The magnitude of the alternating component of this signal is adjusted by means of servo motor 63'.

In view of the foregoing description, it should be evident that improved electrical signal measuring circuits are provided in accordance with this invention. The circuits are adapted to measure either alternating or direct voltages. The circuits of this invention have several distinct advantages. The measured signal is not affected by changes in phase of the input signal, and the circuits can be used to measure signals of any frequency. Another advantage resides in the elimination of the rather large and expensive converters which have heretofore been employed in measuring circuits of this general type.

While the invention has been described in conjunction with present preferred embodiments, it should be evident that it is not limited thereto.

What is claimed is:

1. An analyzer comprising a radiation source to establish a radiation beam; means to position a sample of material to be analyzed into said beam; a chopper positioned in said beam, said chopper having a section transparent to radiation of a wave length absorbed by a material to be detected and a section opaque to radiation of said wave length; means to move said chopper so that said beam passes through the two sections alternately; detector means positioned in said beam to establish a first potential representative of the radiation impinging thereon; and means to measure said first potential comprising means to superimpose a reference second potential on said first potential to establish a third potential, one of said first and second potentials being direct and the other being alternating; a source of reference fourth potential of frequency the same as the frequency of the first and second potential which is alternating; means to compare said third potential with said fourth potential, and means responsive to said means to compare to vary the amplitude of the second potential to tend to equalize said third and fourth potentials, the amount said second potential is varied being representative of changes in the amount of the material being detected.

2. An analyzer comprising a radiation source to establish a radiation beam; means to position a sample of material to be analyzed into said beam; a chopper positioned in said beam, said chopper having a section transparent to radiation of a wave length absorbed by a material to be detected and a section opaque to radiation of said wave length; means to move said chopper so that said beam passes through the two sections alternately; detector means positioned in said beam to establish a first potential which varies in amplitude in accordance with the radiation impinging thereon; and means to measure said first potential comprising means to rectify said first potential to establish a direct second potential, means to superimpose an alternating reference third potential on said second potential to establish a fourth potential, a source of reference fifth potential of frequency the same as the frequency of said third potential, means to compare said fourth potential with said fifth potential, and means responsive to said means to compare to vary the amplitude of said third potential to tend to equalize said fourth and fifth potentials, the amount said third potential is varied being representative of changes in the amount of material being detected.

3. Apparatus for measuring an electrical signal comprising means to establish a first potential representative of the signal to be measured, means to superimpose a reference second potential on said first potential to establish a third potential, one of said first and second potentials being a direct potential and the other being an alternating potential of a first frequency, a source of reference fourth potential of said first frequency, means to compare said third and fourth potentials, and means responsive to said means to compare to vary the amplitude of said second potential to tend to equalize said third and fourth potentials, the amount said second potential is varied being representative of the amplitude of the electrical signal to be measured.

4. Apparatus for measuring an alternating electrical signal comprising means to rectify said signal to establish a first direct potential, means to superimpose a reference second alternating potential on said first potential to establish a third potential, a source of reference alternating fourth potential of the frequency of said second potential, means to compare said third potential with said fourth potential, and means responsive to said means to compare to vary the amplitude of said second potential to tend to equalize said third and fourth potentials, the amount said second potential is varied being representative of the amplitude of the electrical signal to be measured.

5. Apparatus for measuring electrical signals comprising means to superimpose an alternating reference first potential on the signal to be measured to establish a second potential, a reference third potential of the same frequency as said first potential, means to compare said second and third potentials, and means responsive to said means to compare to vary the amplitude of said first potential to tend to equalize said second and third potentials, the amount said first potential is varied being representative of the amplitude of the electrical signal to be measured.

6. Apparatus for measuring a fluctuating electrical signal comprising means to rectify the signal to be measured to establish a first potential, a voltage dividing network, a second potential of first frequency applied across said network, first potential comparing means, means applying said first potential and a portion of the potential drop across said network to the input of said first comparing means, second potential comparing means, a source of alternating third potential of said first frequency, means applying said third potential and the output signal of said first comparing means in opposition to one another to the input of said second comparing means, and means responsive to the output of said second comparing means to vary the amplitude of the potential applied to said first comparing means from said network to tend to equalize the two inputs to said second comparing means, the amount the potential from said network is varied being representative of the changes in the signal being measured.

7. Apparatus for measuring a direct electrical signal comprising a potential dividing network, a source of alternating first potential of first frequency applied across said network, first potential comparing means, means applying the signal to be measured and a portion of the voltage drop across said network to the input of said first comparing means, second potential comparing means, a source of second alternating potential of said first frequency, means applying said second potential and the output signal of said first comparing means in opposition to one another to the input of said second comparing means, and means responsive to the output of said second comparing means to vary the amplitude of the potential applied to said first comparing means from said network to tend to equalize the two inputs to said second comparing means, the amount the potential from said network is varied being representative of changes in the signal being measured.

8. Apparatus for measuring a fluctuating electrical signal comprising means to rectify the signal to be measured to establish a first potential, a potential dividing network, a source of alternating second potential of first frequency applied across said network, a vacuum tube having at least an anode, a cathode and a control grid, means applying said first potential between the control grid of said tube and a point on said network, means connecting the cathode of said tube to a second point on said network, potential comparing means, a source of alternating third potential of said first frequency, means applying said third potential and the output signal from said vacuum tube in opposition to one another to the input of said comparing means, and means responsive to the output of said comparing means to adjust the point the cathode of said tube is connected to said network to tend to equalize the two inputs to said comparing means, the amount of adjustment being representative of changes in the signal to be measured.

9. Apparatus for measuring electrical signals comprising a potential dividing network, a source of alternating first potential of first frequency applied across said network, a vacuum tube having at least an anode, a cathode and a control grid, means applying the signal to be measured between the control grid of said tube and a point on said network, means connecting the cathode of said tube to a second point on said network, potential comparing means, a source of alternating third potential of said first frequency, means applying said third potential and output signal of said vacuum tube in opposition to one another to the input of said comparing means, means responsive to the output of said comparing means to adjust the point the cathode of said tube is connected to said network to tend to equalize the two inputs to said comparing means, the amount of adjustment being representative of changes in the signal being measured.

10. Apparatus for measuring an electrical signal of first frequency comprising a voltage dividing network, a source of direct voltage applied across said network, a first vacuum tube having at least an anode, a cathode and a control grid, means applying one terminal of the source of signal to be measured to the control grid of said first tube and the other terminal of the source of signal to a point on said network, means connecting the cathode of said first tube to a second point on said network, voltage comparing means, a source of alternating voltage of said first frequency, means applying said source of alternating voltage and the output of said first vacuum tube in opposition to the input of said voltage comparing means, and means responsive to the output of said comparing means to adjust the point the cathode of said first tube is connected to said network to tend to equalize the two inputs to said comparing means, the amount of adjustment being representative of changes in the signal to be measured.

11. The combination in accordance with claim 1 wherein said chopper comprises a disk having first and second sectors with the described radiation transmission properties, said means to move said chopper comprises means to rotate said chopper at a first frequency, and said source of second reference potential comprises an alternating current generator actuated by said means to rotate.

12. An analyzer comprising a radiation source to establish a radiation beam; means to interpose a sample of material to be analyzed into said beam; a chopper positioned in said beam, said chopper having a section transparent to radiation of a wave length absorbed by a material to be detected and a section opaque to radiation at said wave length; means to move said chopper so that said beam passes through the two sectors alternately; detector means positioned in said beam to establish an electrical signal which varies in amplitude in accordance with the radiation impinging thereon; and means to measure said electrical signal comprising means to superimpose a first direct reference potential on said electrical signal to establish a second signal, a source of second reference potential of frequency the same as the frequency of said electrical signal, means to compare said second signal with said second potential, and means responsive to said means to compare to vary the amplitude of the first potential superimposed on said electrical signal to tend to equalize said second signal and said second potential, the amount said first potential is varied being representative of changes in the amount of the material to be detected.

13. Apparatus for measuring an electrical signal of first frequency comprising a voltage dividing network, a source of direct voltage applied across said network, first voltage comparing means, means applying the signal to be measured and a portion of the voltage across said network to the input of said first comparing means, second voltage comparing means, a source of alternating voltage of said first frequency, means applying said source of alternating voltage and the output of said first voltage comparing means in opposition to the input of said second voltage comparing means, and means responsive to the output of said second voltage comparing means to vary the amplitude of the voltage applied to said first comparing means from said network to tend to equalize the two inputs to said second voltage comparing means, the amount the voltage from said network is varied being representative of changes in the signal to be measured.

14. The apparatus of claim 10 wherein said comparing means and said means to adjust comprise a second vacuum tube having at least an anode, a cathode and a control grid, said source of alternating voltage and the output of said first vacuum tube being applied to the control grid of said second tube, a two phase reversible induction motor, means applying a signal of said first frequency to the first coil of said motor, and means connecting the second coil of said motor in the anode-cathode circuit of said second vacuum tube.

References Cited in the file of this patent

UNITED STATES PATENTS

| | | |
|---|---|---|
| 2,265,357 | Demarest | Dec. 9, 1941 |
| 2,617,842 | Fink | Nov. 11, 1952 |
| 2,674,696 | Smith et al. | Apr. 6, 1954 |
| 2,679,630 | Felch et al. | May 25, 1954 |
| 2,806,144 | Berger | Sept. 10, 1957 |